US012589723B2

(12) United States Patent
Karich et al.

(10) Patent No.: US 12,589,723 B2
(45) Date of Patent: Mar. 31, 2026

(54) SHEAR-TO-TORQUE GUIDE PIN ASSEMBLY FOR HEAVY-DUTY VEHICLES

(71) Applicant: Hendrickson USA, L.L.C., Schaumburg, IL (US)

(72) Inventors: Matthew P. Karich, Fairlawn, OH (US); Jeffrey R. Wittlinger, Uniontown, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 387 days.

(21) Appl. No.: 18/528,990

(22) Filed: Dec. 5, 2023

(65) Prior Publication Data

US 2024/0239324 A1     Jul. 18, 2024

Related U.S. Application Data

(60) Provisional application No. 63/439,634, filed on Jan. 18, 2023.

(51) Int. Cl.
B60T 17/00          (2006.01)
(52) U.S. Cl.
CPC .................................... B60T 17/00 (2013.01)
(58) Field of Classification Search
CPC .. B60T 17/00; F16D 55/22655; F16D 55/227; F16D 2055/0008; F16D 2055/0016
See application file for complete search history.

(56) References Cited

U.S. PATENT DOCUMENTS

| | | | | | |
|---|---|---|---|---|---|
| 3,443,669 | A | * | 5/1969 | Jeffries | F16D 63/004 |
| | | | | | 188/106 R |
| 4,042,074 | A | * | 8/1977 | Ishihara | F16D 55/22655 |
| | | | | | 188/73.45 |
| 4,051,927 | A | * | 10/1977 | Karasudani | F16D 55/22655 |
| | | | | | 188/73.44 |
| 4,072,216 | A | * | 2/1978 | Haraikawa | F16D 65/0977 |
| | | | | | 188/73.38 |
| 4,109,766 | A | * | 8/1978 | Inoue | F16D 55/22655 |
| | | | | | 188/73.34 |

(Continued)

FOREIGN PATENT DOCUMENTS

| | | |
|---|---|---|
| DE | 4036272 | 5/1992 |
| DE | 19857074 | 6/2000 |

(Continued)

OTHER PUBLICATIONS

Meritor DiscPlus EX225 Air Disc Brakes Brochure, MM0467, 2013.
Workshop Manual—BPW-WH-BR TS2 35531901e, 2019.
T72009 MAXX22TT-415mm ADB Maintenance, 2015.

*Primary Examiner* — Henry Y Liu
(74) *Attorney, Agent, or Firm* — Dureska & Moore, LLC; David P. Dureska; Benjamin J. Chojnacki

(57)          ABSTRACT

A guide pin assembly for use with heavy-duty vehicle disc brake systems, the guide pin assembly comprising a hollow guide pin, a fastener, a separate torque-separable shear adaptor. The guide pin mounts a component of the disc brake system. The fastener is at least partially disposed through the guide pin and engages another component of the disc brake system to attach the guide pin to the other component. The shear adaptor is at least partially disposed within the guide pin and is removably attached to the fastener.

15 Claims, 6 Drawing Sheets

(56) References Cited

U.S. PATENT DOCUMENTS

| | | | | |
|---|---|---|---|---|
| 4,267,904 A * | 5/1981 | Belart | F16D 55/22655 | 188/73.45 |
| 4,279,331 A * | 7/1981 | Lupertz | F16D 55/227 | 188/71.8 |
| 4,311,216 A * | 1/1982 | Garrett | F16D 55/224 | 188/73.43 |
| 4,331,221 A * | 5/1982 | Evans | F16D 55/22655 | 188/73.31 |
| 4,351,421 A * | 9/1982 | Kurata | F16D 55/22655 | 188/73.45 |
| 4,401,194 A * | 8/1983 | Klassen | F16D 55/227 | 188/73.44 |
| 4,458,790 A * | 7/1984 | Hoffman, Jr. | F16D 65/0979 | 188/196 P |
| 4,465,164 A * | 8/1984 | Anderson | F16D 55/227 | 411/395 |
| 4,603,761 A * | 8/1986 | Bernd-Holger | F16D 55/227 | 188/73.45 |
| 4,709,789 A * | 12/1987 | Czich | F16D 55/227 | 188/73.44 |
| 4,722,425 A * | 2/1988 | Weiler | F16D 55/227 | 188/73.34 |
| 4,741,419 A * | 5/1988 | Rath | F16D 65/095 | 188/72.3 |
| 4,747,472 A * | 5/1988 | Rath | F16D 55/227 | 188/73.1 |
| 4,781,273 A * | 11/1988 | Fujinami | B61H 5/00 | 188/73.45 |
| 5,562,187 A * | 10/1996 | Tribuzio | F16D 55/22655 | 188/73.35 |
| 5,593,006 A * | 1/1997 | Le Deit | F16D 55/227 | 188/73.44 |
| 5,632,359 A * | 5/1997 | Camps | F16D 66/025 | 188/1.11 R |
| 5,749,445 A * | 5/1998 | Ruiz Busquets | F16D 55/22655 | 188/73.44 |
| 5,810,122 A * | 9/1998 | Le Deit | F16D 55/227 | 188/73.45 |
| 5,934,416 A * | 8/1999 | Maeda | F16D 55/227 | 188/196 P |
| 6,026,938 A * | 2/2000 | Demoise, Jr. | F16D 55/22655 | 188/73.35 |
| 6,397,983 B1 * | 6/2002 | Roszman | F16D 55/227 | 188/73.44 |
| 6,533,079 B2 * | 3/2003 | Charmat | F16D 55/22655 | 188/73.31 |
| 6,609,594 B1 * | 8/2003 | Charmat | F16D 55/227 | 188/73.37 |
| 6,705,437 B2 * | 3/2004 | Severinsson | F16D 65/12 | 188/73.32 |
| RE38,874 E * | 11/2005 | Bieker | F16D 55/226 | 188/71.1 |
| 8,051,958 B1 * | 11/2011 | Rockwell | F16D 55/227 | 188/73.45 |
| 8,708,111 B2 * | 4/2014 | Dit Cordier | F16D 55/2265 | 188/73.39 |
| 9,284,999 B2 * | 3/2016 | Gerber | F16D 55/22655 | |
| 9,353,810 B2 * | 5/2016 | Morais | F16D 65/0062 | |
| 9,394,954 B2 * | 7/2016 | Smith | F16D 65/0087 | |
| 9,422,991 B2 * | 8/2016 | Nessi | F16D 55/226 | |
| 9,551,387 B2 * | 1/2017 | Smith | F16D 55/22655 | |
| 9,809,208 B2 * | 11/2017 | Bourlon | B60T 13/745 | |
| 9,845,837 B2 * | 12/2017 | Thomas | B23B 49/02 | |
| 9,850,967 B2 * | 12/2017 | Gerber | F16D 55/22655 | |
| 9,869,357 B2 * | 1/2018 | Knoop | F16D 65/18 | |
| 9,920,799 B2 * | 3/2018 | Maehara | F16D 55/227 | |
| 9,951,832 B2 * | 4/2018 | Crippa | F16D 55/227 | |
| 10,054,175 B2 * | 8/2018 | Kula | F16D 55/226 | |
| 10,094,438 B2 * | 10/2018 | Gerber | F16D 65/0006 | |
| 10,221,904 B2 * | 3/2019 | Knoop | F16D 65/0087 | |
| 10,302,161 B2 * | 5/2019 | Roberts | F16J 3/02 | |
| 10,480,598 B2 * | 11/2019 | Becker | F16D 65/0087 | |
| 10,781,872 B2 * | 9/2020 | Jedele | F16D 55/227 | |
| 10,801,566 B2 * | 10/2020 | Taylor | F16D 55/22655 | |
| 10,890,221 B2 * | 1/2021 | Minoshima | F16D 55/2245 | |
| 11,313,423 B2 * | 4/2022 | Taylor | F16D 55/22655 | |
| 11,698,115 B2 * | 7/2023 | Willey | F16D 65/0006 | 188/73.38 |
| 11,773,928 B2 * | 10/2023 | Philpott | F16D 55/227 | 188/73.44 |
| 12,044,278 B2 * | 7/2024 | Jenkins | F16D 65/0006 | |
| 2003/0015381 A1 * | 1/2003 | Charmat | F16D 55/22655 | 188/73.31 |
| 2008/0029356 A1 * | 2/2008 | Halasy-Wimmer | F16D 55/22655 | 188/73.45 |
| 2008/0093181 A1 * | 4/2008 | Waag | F16D 55/22655 | 188/73.44 |
| 2008/0128223 A1 * | 6/2008 | Dit Cordier | F16D 55/2265 | 188/73.31 |
| 2012/0067678 A1 * | 3/2012 | Andrews | F16D 65/095 | 188/206 A |
| 2014/0097050 A1 * | 4/2014 | Crippa | F16D 55/227 | 188/73.44 |
| 2014/0231191 A1 * | 8/2014 | Morais | F16D 55/226 | 188/73.31 |
| 2014/0262636 A1 * | 9/2014 | Gerber | F16D 55/22655 | 188/73.44 |
| 2014/0262637 A1 * | 9/2014 | Smith | F16D 65/0087 | 188/73.44 |
| 2015/0021125 A1 * | 1/2015 | Nessi | F16D 55/228 | 188/72.5 |
| 2015/0260244 A1 * | 9/2015 | Maehara | F16D 65/0977 | 188/250 F |
| 2015/0323022 A1 * | 11/2015 | Thomas | F16D 55/22655 | 408/1 R |
| 2015/0330467 A1 * | 11/2015 | Bourlon | B60T 13/745 | 475/149 |
| 2016/0230823 A1 * | 8/2016 | Smith | F16D 55/227 | |
| 2016/0356325 A1 * | 12/2016 | Knoop | F16D 55/22655 | |
| 2016/0356326 A1 * | 12/2016 | Knoop | F16D 55/22655 | |
| 2017/0198771 A1 * | 7/2017 | Gerber | F16D 55/22655 | |
| 2017/0261051 A1 * | 9/2017 | Becker | F16D 55/2265 | |
| 2017/0335911 A1 * | 11/2017 | Roberts | F16J 3/02 | |
| 2017/0350461 A1 * | 12/2017 | Maehara | F16D 65/095 | |
| 2018/0080510 A1 * | 3/2018 | Thomas | B23B 41/00 | |
| 2018/0119760 A1 * | 5/2018 | Gerber | F16D 55/22655 | |
| 2018/0142742 A1 * | 5/2018 | Kula | F16D 55/22655 | |
| 2019/0162256 A1 * | 5/2019 | Taylor | F16D 55/227 | |
| 2019/0195299 A1 * | 6/2019 | Knoop | F16D 55/22655 | |
| 2020/0132142 A1 * | 4/2020 | Jedele | F16D 55/227 | |
| 2020/0256410 A1 * | 8/2020 | Willey | F16D 55/22655 | |
| 2020/0300311 A1 * | 9/2020 | Minoshima | F16D 65/0977 | |
| 2020/0378457 A1 * | 12/2020 | Knoop | F16D 55/227 | |
| 2021/0025464 A1 * | 1/2021 | Taylor | F16D 66/028 | |
| 2022/0186797 A1 * | 6/2022 | Philpott | F16D 65/0087 | |
| 2022/0299075 A1 * | 9/2022 | Szafnauer | F16D 55/22655 | |
| 2023/0072036 A1 * | 3/2023 | Bosis | F16D 55/22655 | |
| 2023/0089215 A1 * | 3/2023 | Jenkins | F16D 65/0087 | 188/73.44 |
| 2023/0383798 A1 * | 11/2023 | Shahin | F16D 65/0087 | |

FOREIGN PATENT DOCUMENTS

| | | |
|---|---|---|
| DE | 102010037679 | 3/2012 |
| EP | 2218932 | 8/2010 |

* cited by examiner

SHEAR-TO-TORQUE GUIDE PIN ASSEMBLY FOR HEAVY-DUTY VEHICLES

CROSS-REFERENCE TO RELATED APPLICATION

This application claims the benefit of U.S. Provisional Patent Application No. 63/439,634, filed Jan. 18, 2023.

BACKGROUND OF THE INVENTION

The present invention relates generally to the art of braking systems for heavy-duty vehicles. In particular, the present invention relates to braking systems for heavy-duty vehicles that utilize disc brakes. More particularly, the invention is directed to a guide pin assembly with a shear-to-torque feature and a piloting or supporting adaptor for use with a heavy-duty vehicle disc brake system, the guide pin assembly allowing for the use of commonly-available, low-profile tools and facilitating consistent torques, thereby removing complexity and error during assembly.

BACKGROUND ART

The use of braking systems on heavy-duty vehicles is well-known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include drum brake systems and disc brake systems.

Disc brake systems are generally incorporated into an axle/suspension system of the heavy-duty vehicle. More specifically, disc brake systems include a plurality of disc brake assemblies, each operatively mounted on or adjacent a respective wheel end assembly of the heavy-duty vehicle. Each wheel end assembly, in turn, is rotatably mounted on a respective spindle fixedly connected to an end of an axle of the heavy-duty vehicle, as is known. A pair of suspension assemblies connects the axle to members of a frame or subframe of the heavy-duty vehicle, forming the axle/suspension system. For those heavy-duty vehicles that support a subframe, the subframe can be non-movable or movable, the latter being commonly referred to as a slider box, slider subframe, slider undercarriage, secondary slider frame, or bogey.

Each disc brake assembly typically includes a torque plate supporting a carrier, which, in turn, supports a caliper. The torque plate is rigidly connected, such as by welding, to an axle of the axle/suspension system on or adjacent a wheel end of the heavy-duty vehicle. The carrier is attached to and supported by the torque plate, typically by mechanical fasteners, such as bolts. The carrier is formed with a pair of threaded openings extending through the carrier and having respective counterbores formed on the inboard side of the carrier around each of the threaded openings. The caliper is slidably connected to the carrier by a prior art guide pin assembly, as is known. In particular, an inboardly extending hollow guide pin is positioned within each counterbore of the carrier and is attached to the carrier by a fastener disposed partially within the guide pin and engaging the respective threaded opening of the carrier. More particularly, the caliper is formed with a pair of bores having respective bushings press fit within the bores for receiving the respective guide pins, enabling the caliper to slidably engage the guide pins and allow transverse movement of the caliper relative to the carrier.

The caliper is also formed with a bore for receiving one or more pistons and openings for receiving an actuator. The actuator typically is a brake air chamber, or brake chamber, in fluid communication with a compressed air source to activate movement of the piston(s) through a sealed mechanical actuation mechanism. The sealed mechanical actuation mechanism amplifies the force between the air actuator and the piston(s). The caliper is also formed with an outboard pad seat disposed opposite the piston(s). A pair of opposing brake pads having friction material mounted on a backing plate are seated in the carrier such that one of the pads is adjacent the piston(s) and the other pad is adjacent the outboard pad seat.

Each disc brake assembly also includes a rotor having a disc portion, a mounting portion, and a sleeve integrally formed with and extending between the disc portion and the mounting portion. The disc portion of the rotor is disposed between the pair of opposing brake pads such that the friction material of each pad faces a respective one of an inboard and an outboard surface of the disc portion. The mounting portion is adapted for mounting to a wheel hub of a respective wheel end assembly by mechanical fasteners, such as bolts, enabling the rotor to be rigidly connected to the wheel hub. The wheel hub, in turn, is rotatably mounted on the axle with one or more tire rims and tires mounted on the wheel hub, such that the rotor rotates about the axle of the heavy-duty vehicle as the tire rotates.

Disc brake assemblies may have an alternate configuration that does not utilize a carrier. In such configurations, the caliper is slidably connected by a prior art guide pin assembly directly to the torque plate. More specifically, the torque plate is formed with a pair of threaded openings extending through the torque plate. Respective counterbores are formed on the inboard side of the torque plate around each of the openings. An inboardly extending hollow guide pin is positioned within each counterbore and attached to the torque plate by a fastener disposed partially within the guide pin and engaging the threaded opening. The caliper is then mounted on the guide pins in a manner similar to that described above.

During operation, once the disc brake assembly is engaged, compressed air flows to the brake chamber, causing actuation of the disc brake assembly, which causes extension of the caliper piston(s) in an outboard direction, thereby forcing the brake pad adjacent the piston(s) outboardly against the inboard surface of the disc portion of the rotor. The force exerted by the piston(s) against the brake pad and inboard surface of the disc portion of the rotor causes the caliper to slide along the guide pins of prior art guide pin assembly in an inboard direction, forcing the brake pad adjacent outboard pad seat against the outboard surface of the disc portion. Contact of the friction material of the brake pads against the disc portion of the rotor slows and/or stops the heavy-duty vehicle wheel. The torque plate reacts and resists the torque generated during braking and maintains proper alignment of the caliper to ensure optimum operation of the components of the disc brake assembly.

Prior art guide pin assemblies, while performing adequately, have certain disadvantages, drawbacks, and limitations. For example, during assembly or maintenance of the disc brake assembly, the fasteners for the prior art guide pins must be tightened to a specific torque using large pieces of equipment in order to ensure proper operation of the disc brake assembly. Due to packaging constraints of the axle/suspension system and disc brake assembly, use of these large pieces of equipment during assembly and maintenance may be difficult or impossible and/or potentially error-prone, potentially resulting in improper operation of and/or a reduction in the service-life of components of the disc brake assembly.

Some prior art guide pin assemblies have incorporated shear-to-torque technology into the guide pin fasteners in order to facilitate the use of low-profile tools that operate within the clearances of the packaging constraints of the disc brake assembly. However, such prior art shear-to-torque fasteners may still be subject to off-axis or out-of-plane torque, potentially altering the torque at which the shear joint fractures and/or failing to fracture in the desired location, resulting in improperly torqued fasteners and/or improperly fractured fasteners that may affect the assembly and disassembly, operation, and/or service-life of the disc brake assembly, thereby increasing the cost of maintenance and repair and the amount of heavy-duty vehicle downtime. In addition, prior art shear-to-torque fasteners are typically designed such that the fasteners generally require the use of one or more specialized tools. For instance, prior art shear-to-torque fasteners typically have a first interface that enables engagement of the fastener by a specialized tool for installing and torquing the fastener. Once the prior art shear-to-torque fastener is sufficiently torqued and the shear joint is fractured, a different interface remains in order for a different tool to engage the fastener for adjustment, maintenance, and/or disassembly. The utilization of one or more specialized tools complicates assembly and maintenance of the guide pin assembly and increases cost and down time of the heavy-duty vehicle.

Thus, there is a need in the art for a guide pin assembly for heavy-duty vehicles that allows for the use of commonly-available, low-profile tools in tight clearance conditions and provides a shear-to-torque interface with a piloting or supporting adaptor that removes complexity and error during assembly and facilitates consistent torques.

SUMMARY OF THE INVENTION

Objectives of the present invention include providing a guide pin assembly for heavy-duty vehicles that allows for the use of commonly-available, low-profile tools in tight clearance conditions.

A further objective of the present invention is to provide a guide pin assembly for heavy-duty vehicles that includes a shear-to-torque interface with a piloting or supporting adaptor that removes complexity and error during assembly and facilitates consistent torques.

These objectives and advantages are obtained by the guide pin assembly, according to the present invention, for use with heavy-duty vehicle disc brake systems, the guide pin assembly comprising a hollow guide pin, a fastener, and a discrete torque-separable shear adaptor. The guide pin mounts a component of the disc brake system. The fastener is at least partially disposed through the guide pin and engages another component of the disc brake system to attach the guide pin to the other component. The shear adaptor is at least partially disposed within the guide pin and removably attached to said fastener.

BRIEF DESCRIPTION OF THE SEVERAL VIEWS OF THE DRAWINGS

The preferred embodiment of the present invention, illustrative of the best mode in which Applicant has contemplated applying the principles, is set forth in the following description, shown in the drawings, and particularly and distinctly pointed out and set forth in the appended claims.

Similar characters refer to similar parts throughout.

DESCRIPTION OF THE PREFERRED EMBODIMENT

Figure 1:
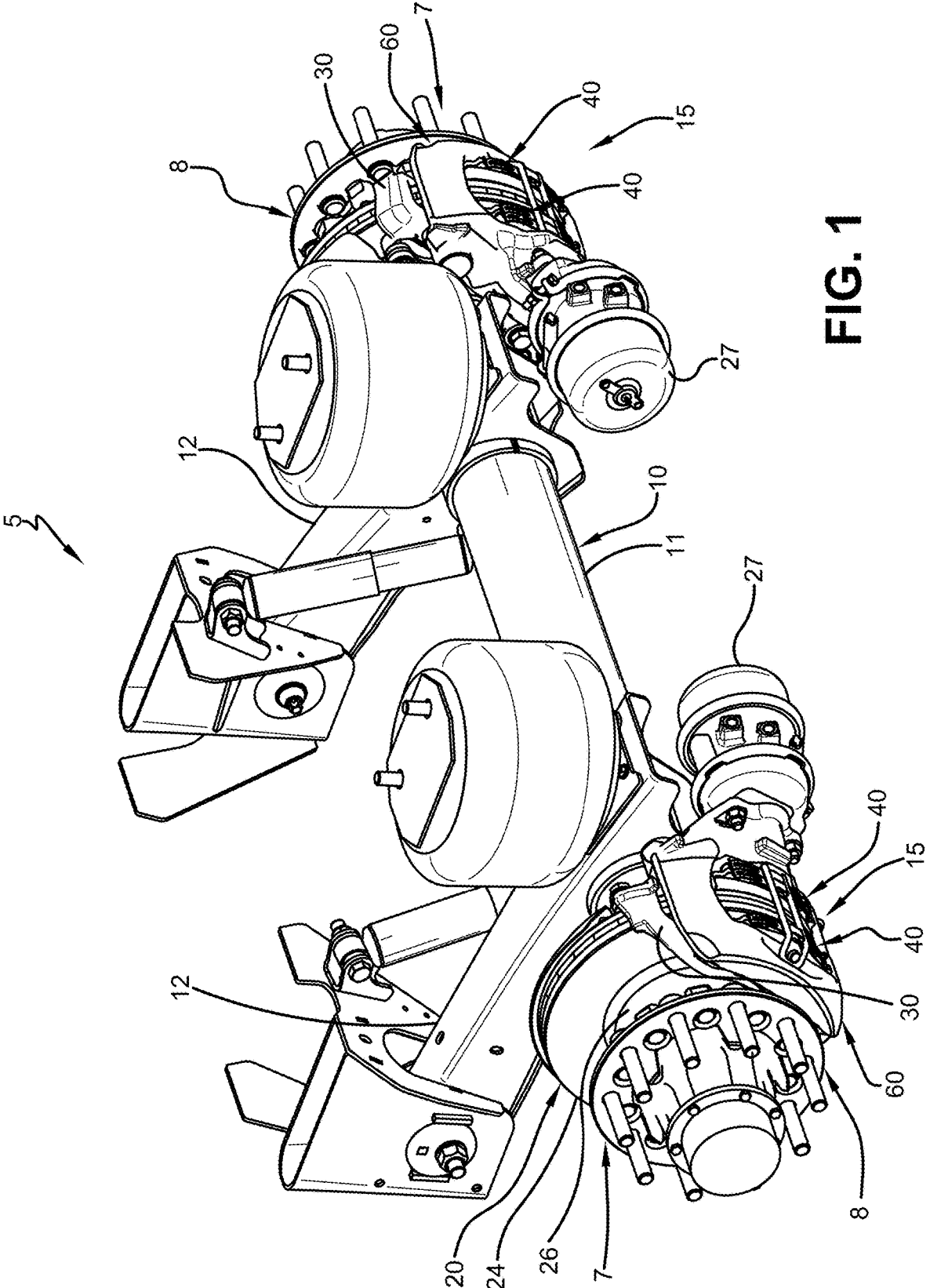
FIG. 1 is a perspective view of a heavy-duty vehicle axle/suspension system incorporating a pair of air disc brake assemblies.
Figure 2:
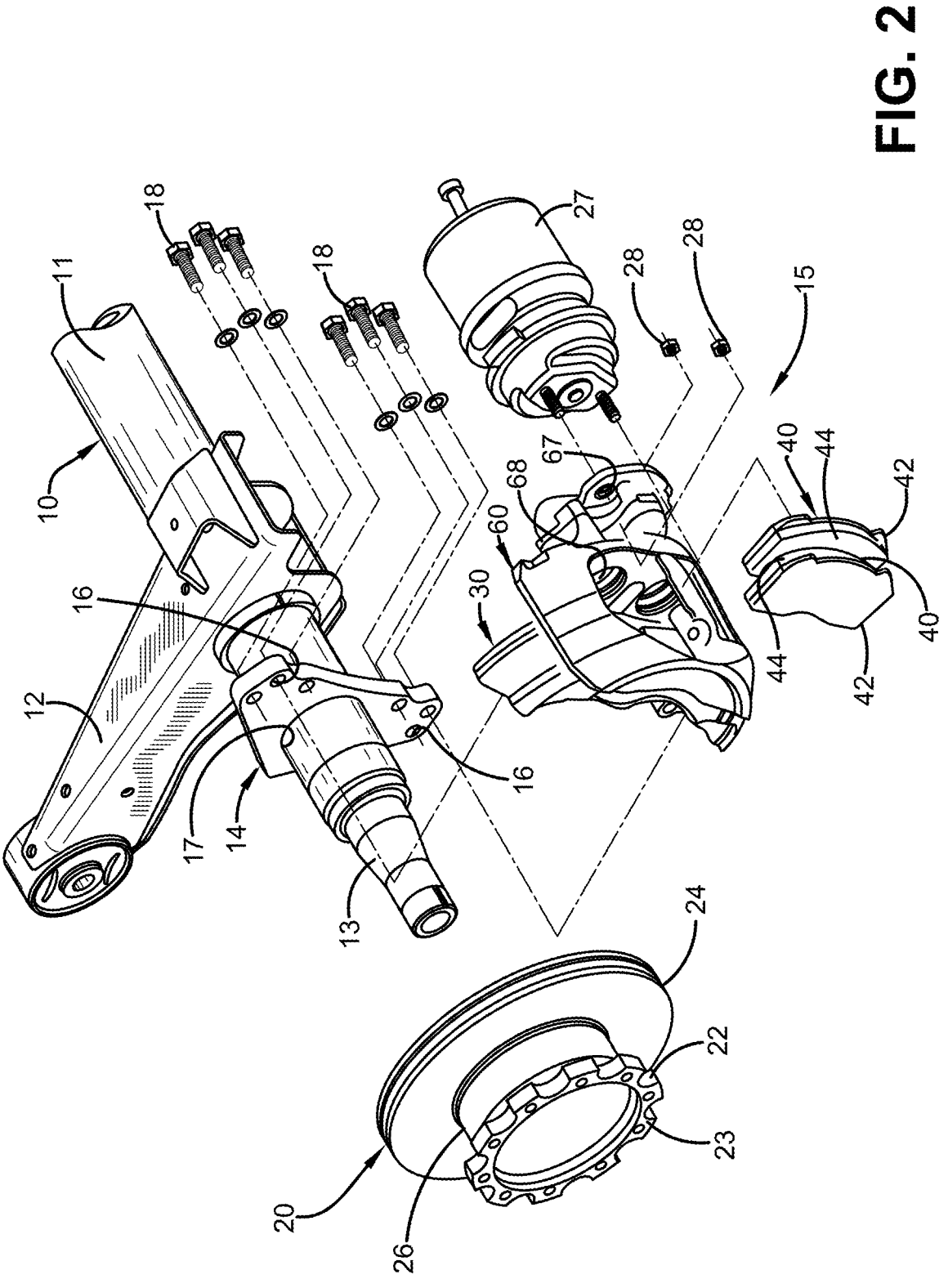
FIG. 2 is a fragmentary exploded view of the disc brake assembly shown in FIG. 1.
Figure 3:
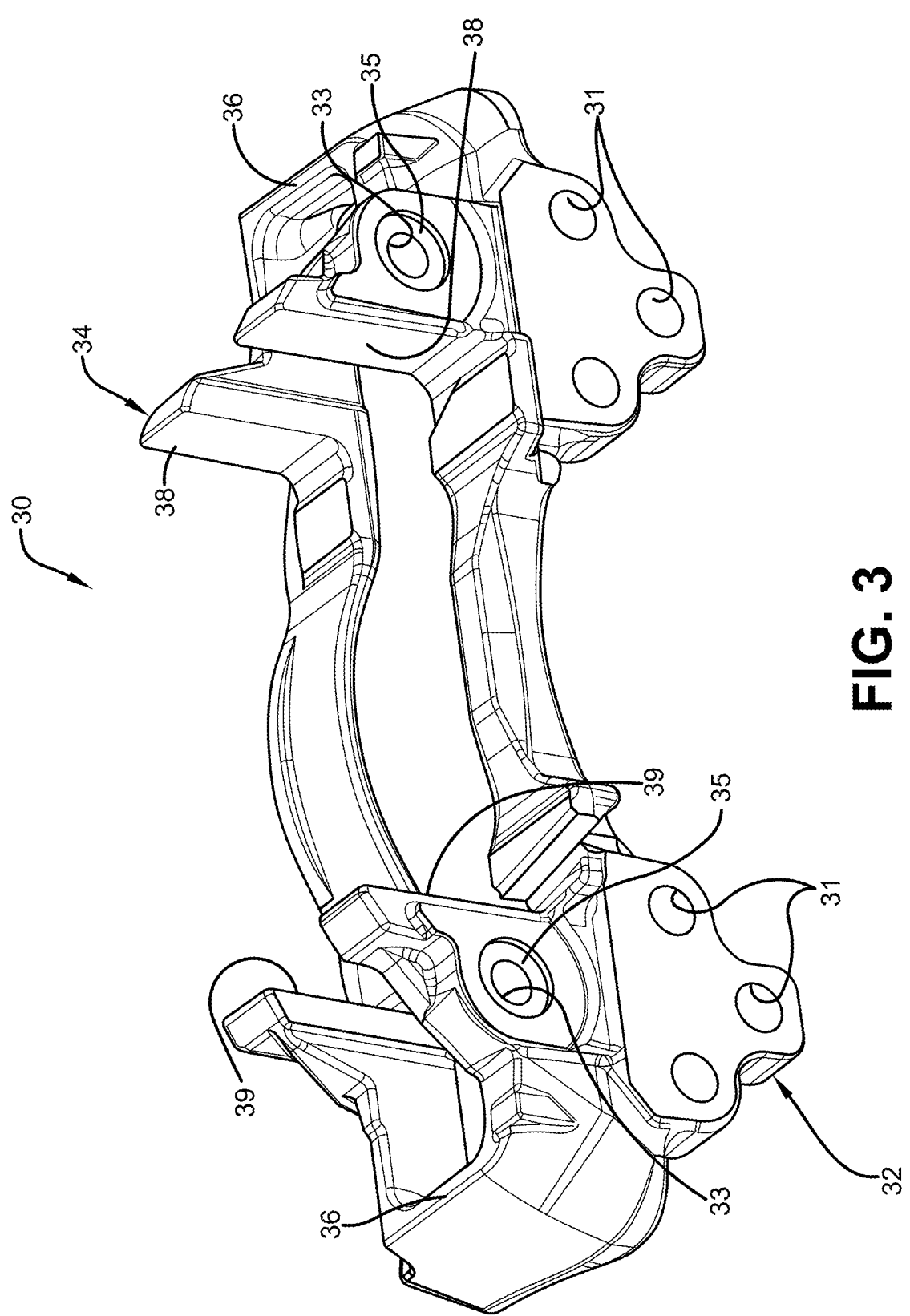
FIG. 3 is a perspective view of a carrier of the disc brake assembly shown in FIGS. 1-2.

An exemplary embodiment guide pin assembly 80 (FIGS. 4-6), according to the present invention, may be incorporated into any disc brake assembly, such as a disc brake assembly 15 (FIGS. 1-5) mounted to an axle/suspension system 5 of a heavy-duty vehicle (not shown).

Axle/suspension system 5 includes an axle 10 and a pair of beams 12. Axle 10 includes a central tube 11 and a pair of spindles 13 (FIG. 2) (only one shown) fixedly attached to opposite ends of the central tube by any suitable means, such as welds. Beams 12 are spaced apart along and rigidly attached to central tube 11 by any suitable means, such as welds. A pair of wheel end assemblies 7 each include a wheel hub 8 rotatably mounted on the respective spindle 13. Respective mirror-image disc brake assemblies 15 are located on transversely opposite sides of axle/suspension system 5 and are attached to or adjacent respective wheel end assemblies 7, as is known. Because disc brake assemblies 15 are mirror images of one another, and for the sake of clarity and conciseness, only one of the disc brake assemblies will be described below.

Disc brake assembly 15 includes a rotor 20 removably attached to wheel hub 8. Rotor 20 includes a radially-extending mounting portion or flange 22, a radially extending disc portion 24 and an axially-extending sleeve 26. Flange 22 is integrally formed with sleeve 26, which extends between and interconnects the flange and disc portion 24. Flange 22 is formed with a plurality of openings 23 that align with corresponding openings (not shown) formed in wheel hub 8, which together receive respective fasteners (not shown) to removably secure rotor 20 to the wheel hub such that the rotor rotates with the wheel hub.

Disc brake assembly 15 also includes a torque plate 14, a carrier 30, and a caliper 60. Torque plate 14 is attached to axle 10 adjacent beam 12. In particular, torque plate 14 is formed with a bore 17 extending transversely through the torque plate. More particularly, central tube 11 of axle 10 is disposed through bore 17 such that torque plate 14 is positioned outboardly from beam 12. Torque plate 14 is generally rigidly attached, such as by welds, to central tube 11 along the interface between bore 17 and the central tube, as is known. Torque plate 14 is also formed with a plurality of transversely-extending openings 16 adjacent respective longitudinal ends of the torque plate.

Carrier 30 is formed with an inboard portion 32 (FIG. 3), an outboard portion 34, and a pair of integral bridge arms 36 extending between respective longitudinal ends of the inboard and outboard portions. Each of the inboard and outboard portions 32, 34, respectively, are formed with respective leading and trailing abutments 38, 39 for receiving and supporting a pair of opposing brake pads 40. Brake pads 40 each include a high coefficient of friction material 44 mounted on or attached to a backing plate 42. More specifically, each of brake pads 40 are seated in between the respective leading abutment 38 and trailing abutment 39 of the respective inboard and outboard portion 32, 34 of carrier 30 such that friction material 44 of the brake pads face in opposition. Carrier 30 is also formed with a plurality of transversely-extending openings 31 and a pair of transversely-extending threaded openings 33. Openings 31 are formed through inboard portion 32 of carrier 30 adjacent the longitudinal ends of the carrier in symmetrical arrangements that align with openings 16 of torque plate 14 to enable removable attachment of the carrier to the torque plate. In particular, carrier 30 is mounted on and removably attached to torque plate 14 by a plurality of fasteners 18 received through aligned openings 16, 31 of the torque plate and the carrier, respectively. More particularly, carrier 30 is disposed at least partially over and about disc portion 24 of rotor 20 and attached to torque plate 14 such that inboard and outboard portions 32, 34, respectively, and, thus, friction material 44 of brake pads 40, are disposed adjacent respective inboard and outboard faces of the disc portion. Threaded openings 33 are each formed through inboard portion 32 of carrier 30 adjacent to and vertically offset from openings 31. Each of threaded openings 33 includes a corresponding counterbore 35 formed about the periphery of the respective opening and extending inboardly partially into inboard portion 32 of carrier 30.

Figure 4:
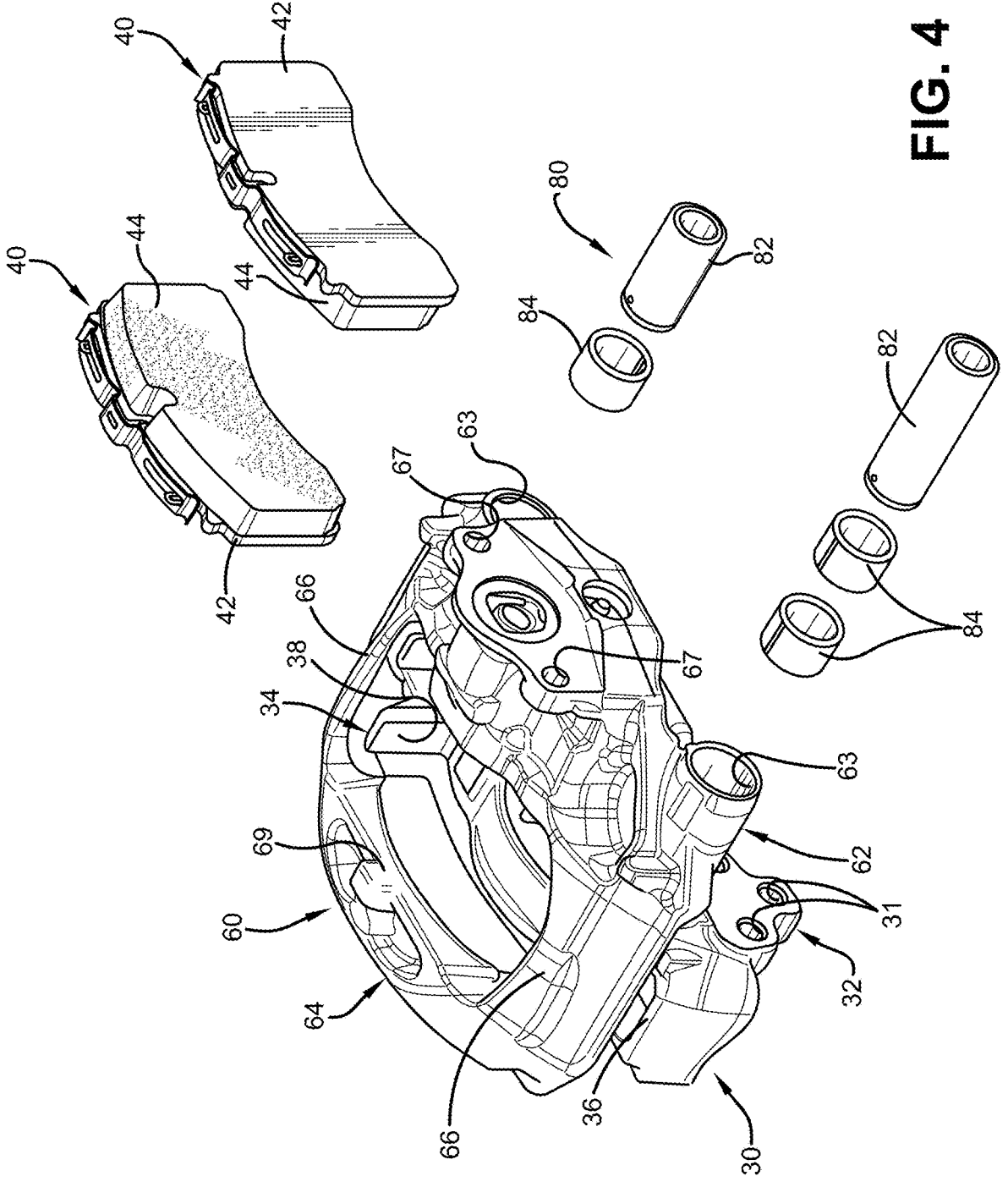
FIG. 4 is partial exploded view of a portion of the disc brake assembly shown in FIGS. 1-2, showing components of an exemplary embodiment guide pin assembly mounting the caliper to the carrier.

With particular reference to FIG. 4, caliper 60 is integrally formed with an inboard portion 62, an outboard portion 64, and a pair of bridge arms 66 extending between the longitudinal ends of the inboard and outboard portions, as is known. Outboard portion 64 of caliper 60 includes an inboard-facing pad seat 69 for contacting backing plate 42 of one of brake pads 40 during actuation of disc brake assembly 15. Inboard portion 62 of caliper 60 is formed with a pair of openings 67 for mounting an actuator or brake chamber 27 with a pair of nuts 28. Brake chamber 27 is in fluid communication with a compressed air source (not shown) of the heavy-duty vehicle (not shown) for activating movement of one or more pistons (not shown). Inboard portion 62 is also formed with one or more outboard-facing bores 68 for receiving the one or more pistons. Inboard portion 62 also includes a pair of bores 63 longitudinally-spaced apart from each other and extending through the inboard portion. Bores 63 are formed such that the bores align with corresponding threaded openings 33 and counterbores 35 of carrier 30 to allow caliper 60 to be mounted or removably attached to the carrier. Alternatively, it is also contemplated that in certain configurations of disc brake assembly 15, the disc brake assembly does not include carrier 30. In such a configuration, caliper 60 may be mounted on and slidably connected to torque plate 14 in a manner similar to that described below.

More specifically, and in accordance with an important aspect of the present invention, caliper 60 is slidably mounted on and connected to carrier 30 by exemplary embodiment guide pin assembly 80. Guide pin assembly 80 includes a pair of hollow guide pins 82. Guide pins 82 are formed as generally tubular structures made of any suitable material, such as metal. Each guide pin 82 is positioned at least partially within and extends inboardly of the respective counterbore 35 of inboard portion 32 of carrier 30. Guide pins 82 may have any suitable length and may also be different relative lengths and/or diameters to prevent potential binding and ensure proper travel and motion of caliper 60 during braking, as is known.

Guide pin assembly 80 also includes at least a pair of cylindrical or tubular bushings 84 disposed within bores 63 of caliper 60. Bushings 84 have an inner diameter or dimension (not shown) that is equivalent to or slightly larger than an outer diameter or dimension (not shown) of guide pins 82. Bushings 84 also have an outer diameter or dimension (not shown) that is equivalent to or slightly less than the inner diameter or dimension of bores 63 of caliper 60. Bushings 84 are disposed within bores 63 in an interference-fit manner and receive respective guide pins 82 such that the guide pins, and thus caliper 60, are able to slide relative to the bushings and carrier 30, respectively.

Figure 5:
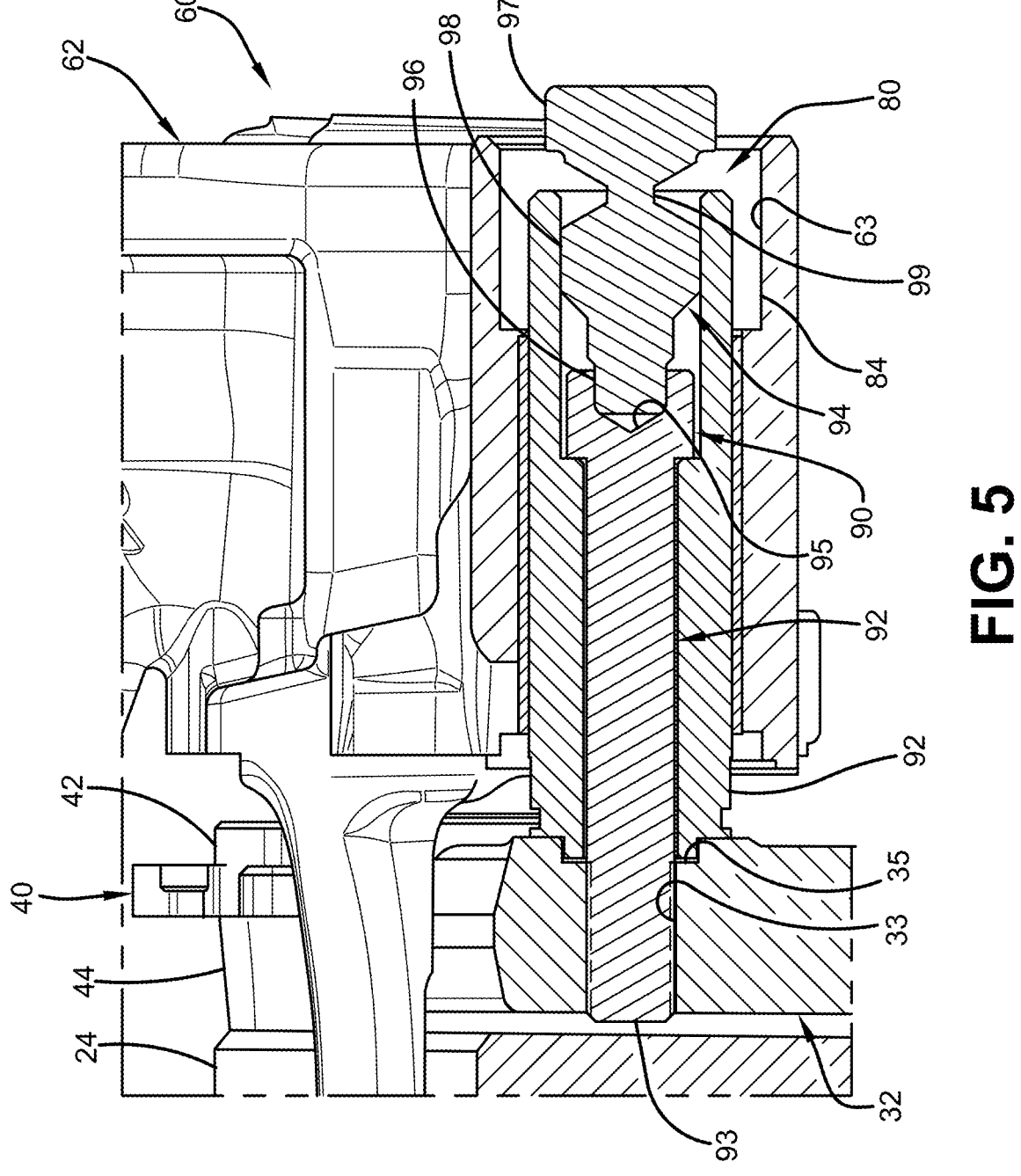
FIG. 5 is a fragmentary elevational view, partially in section, of a portion of the disc brake assembly shown in FIGS. 1-2 and 4, showing the exemplary embodiment guide pin assembly mounting the caliper to the carrier.
Figure 6:
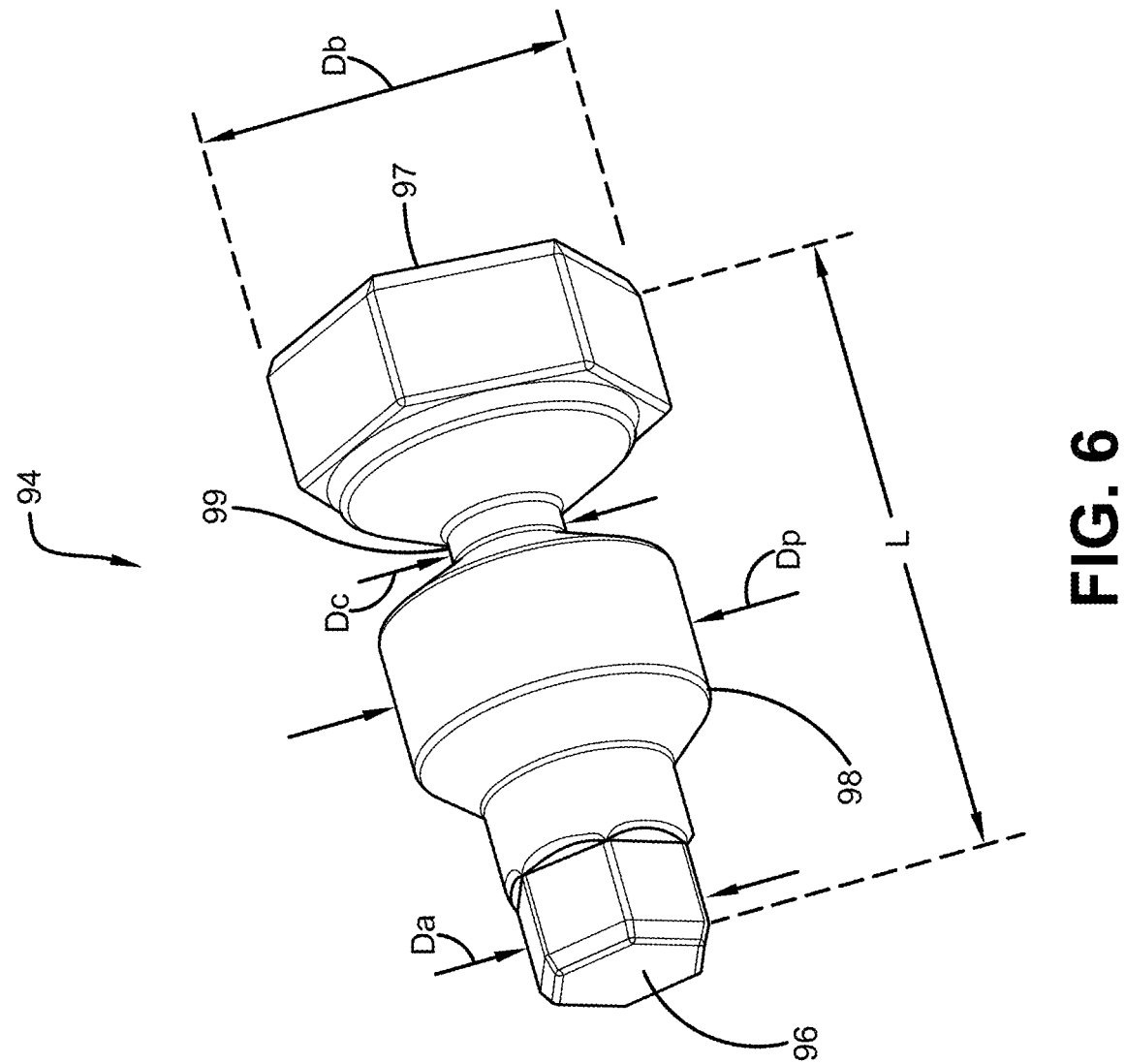
FIG. 6 is a perspective view of the shear adaptor of the fastener subassembly of the exemplary embodiment guide pin assembly shown in FIG. 5.

In accordance with another important aspect of the present invention, exemplary embodiment guide pin assembly 80, according to the present invention, includes a pair of fastener sub-assemblies 90 (only one shown) (FIG. 5). Each fastener sub-assembly 90 includes any suitable attachment structure or fastener 92 and a discrete torque-separable shear adaptor 94. Fastener 92 may be any suitable fastener, such as a bolt, made of any suitable material, such as metal, and include a threaded end 93 axially opposite a head and/or common tool interface 95, such as a socket head. Fasteners 92 of fastener sub-assemblies 90 may removably attach guide pins 82 to carrier 30. More specifically, fastener 92 may be disposed within and extend at least partially through the respective guide pin 82 to engage the respective threaded opening 33 of carrier 30.

Shear adaptor 94 may be removably attached to fastener 92 at interface 95 of the fastener. In particular, shear adaptor 94 is generally cylindrical with an outboard end 96 and an axially opposite inboard end 97. More particularly, outboard end 96 is sized and includes any suitable shape, such as hexagonal, that enables engagement between interface 95 of fastener 92 and the outboard end of shear adaptor 94. Outboard end 96 of shear adaptor 94 may be attached to interface 95 of fastener 92 using a suitable light adhesive that breaks, or fractures, when sufficient torque is applied to fastener sub-assembly 90, allowing the outboard end to be separated from the interface such that the interface is undamaged and becomes accessible.

Shear adaptor 94 also includes an axial length or dimension L having any suitable length sufficient to ensure the clearance of the inboard end of guide pin 82 by, and thus the accessibility of, inboard end 97. In addition, axial dimension L may be any suitable length sufficient to ensure engagement between outboard end 96 of shear adaptor 94 and interface 95 of fastener 92. More specifically, axial dimension L may be in the range of from about 2.00 inches to about 3.00 inches, more preferably from about 2.30 inches to about 2.40 inches. Shear adaptor 94 also includes an outer diameter or dimension that is generally less than the inner dimension of guide pin 82. In particular, the outer dimension of shear adaptor 94 may be in the range of from about 0.6 inches to about 1.2 inches, more preferably from about 0.9 inches to about 1.0 inches. More particularly, the outer dimension of shear adaptor 94 may vary along axial dimension L such that the shear adaptor may have a non-uniform profile with a plurality of different, axially-arranged outer dimensions. For example, shear adaptor 94 may have an outer dimension Da at outboard end 96 that is sized to allow for engagement between the outboard end and interface 95 of fastener 92, as described above. Shear adaptor 94 may also have an outer dimension Db at inboard end 97 that is less than, greater than, or equal to dimension Da and is sized in particular to allow for engagement between the inboard end and a commonly available, low-profile tool (not shown).

In accordance with yet another important aspect of the present invention, inboard end 97 of shear adaptor 94 allows for the use of commonly-available tools during assembly and maintenance of drum brake assembly 15. In particular, inboard end 97 is generally formed axially-opposite outboard end 96 and customizable with any suitable shape or interface allowing engagement of the inboard end without the use of specialized tools. More specifically, inboard end 97 of shear adaptor 94 may include a shape suitable for engagement with a socket wrench or other commonly-available, low-profile tools. As a result, assembly and maintenance of carrier 30 or torque plate 14, caliper 60, and guide pin assembly 80 does not require use of specialized equipment or tools such that assembly and maintenance is relatively easier and less complicated.

In accordance with an important aspect of the present invention, inboard end 97 of shear adaptor 94 also includes a shear-to-torque feature. In particular, shear adaptor 94 includes a collar 99 located axially adjacent inboard end 97. More particularly, collar 99 includes an outer diameter or dimension Dc that allows the collar to fracture or shear at a predetermined, optimal torque for fastener 92 to attach guide pins 82 to carrier 30 or torque plate 14. Outer dimension Dc may be in the range of from about 0.25 inches to about 0.50 inches, more preferably from about 0.35 inches to about 0.42 inches, allowing collar 99 to shear at a torque in the range of from about 125 pound-feet to about 230 pound-feet, more specifically from about 180 pound-feet to about 200 pound-feet. As a result, attachment of guide pins 82 to carrier 30 or torque plate 14 at the optimal torque is ensured because inboard end 97 shears off at the predetermined, optimal torque, preventing over-torquing of fastener 92, thereby reducing error during assembly and maintenance of disc brake assembly 15. Similarly, because collar 99 does not fracture or shear until the predetermined optimal torque is reached, shear adaptor 94 remains intact and serves as an indicator that optimal torque has not yet been applied to fastener 92, preventing under-torquing of the fastener.

In accordance with another important aspect of the present invention, shear adaptor 94 of fastener sub-assembly 90 also includes a piloting region 98. Piloting region 98 may be formed as a generally-cylindrical section located axially along shear adaptor 94 midway between outboard end 96 and inboard end 97. It is also contemplated that piloting region 98 may be located adjacent either outboard end 96 or inboard end 97. Piloting region 98 of shear adaptor 94 ensures consistent torque application to fastener 92, and thus proper fracturing of collar 99. In particular, piloting region 98 may have an outer dimension Dp that is greater than outer dimension Dc of collar 99 and equivalent to or slightly less than the inner diameter of guide pin 82. More particularly, outer dimension Dp may be in the range of from about 0.6 inches to about 1.2 inches, more preferably from about 0.9 inches to about 1.0 inches. As a result, when fastener sub-assembly 90 is disposed within guide pin 82, piloting region 98 may contact the inner surface of the guide pin, providing support to and ensuring that the fastener sub-assembly, and in particular shear adaptor 94, remains centered within the guide pin, thereby minimizing or eliminating wobbling of the sub-assembly. Thus, shear adaptor 94 of fastener sub-assembly 90 reduces or eliminates off-axis torque application to fastener 92 during assembly and installation, thereby preventing incorrect fracturing or shearing of collar 99 of the shear adaptor or over- or under-torquing of the fastener into carrier 30 or torque plate 14.

During operation of the heavy-duty vehicle (not shown), when disc brake assembly 15 is engaged, compressed air flows to actuator 27 causing outboard movement of the piston(s) of caliper 60. The piston(s) forces the adjacent brake pad 40 in an outboard direction against the inboard surface of disc portion 24 of rotor 20. The force of the piston(s) against brake pad 40 is reacted by disc portion 24, causing caliper 60 to be pulled along guide pin assembly 80 inboardly relative to carrier 30 or torque plate 14. More specifically, bushings 84 disposed within bores 63 of caliper 60 allow the caliper to slide along respective guide pins 82 such that brake pad 40 adjacent pad seat 69 contacts the outboard surface of disc portion 24 of rotor 20. Contact of brake pads 40 against the inboard and outboard surfaces of disc portion 24 of rotor 20 slows and/or stops the heavy-duty vehicle and generates forces, such as torque, that act on caliper 60 and carrier 30, or torque plate 14, and is resisted by the torque plate.

Thus, exemplary embodiment guide pin assembly 80, according to the present invention, provides shear-to-torque fastener sub-assembly 90 with shear adaptor 94 for attaching guide pins 82 to carrier 30 or torque plate 14, allowing for the utilization of commonly-available, low-profile tools during assembly and maintenance of disc brake assembly 15. Shear adaptor 94 of fastener sub-assembly 90 also provides piloting region 98 that supports and centers the fastener sub-assembly within guide pin 82, ensuring proper fracturing or shearing of collar 99 at the predetermined, optimal torque for fastener 92 to attach the guide pin to carrier 30 or torque plate 14, thereby facilitating consistent torques and removing complexity and error during assembly and maintenance.

It is to be understood that exemplary embodiment guide pin assembly 80, according to the present invention, may be utilized in connection with axle/suspension systems, wheel end assemblies, and/or brake system components other than those shown and described above without affecting the overall concept or operation of the present invention. It is further to be understood that components of guide pin assembly 80, including guide pins 82, bushings 84, and fastener sub-assemblies 90, may be formed from any suitable material or combination of materials using any suitable methods without affecting the overall concept or operation of the invention.

The present invention has been described with reference to a specific exemplary embodiment. This illustration is by way of example and not by way of limitation. Potential modifications and alterations will occur to others upon a reading and understanding of this disclosure, and it is understood that the invention includes all such modifications, alterations, and equivalents. In the foregoing description, certain terms have been used for brevity, clarity, and understanding, but no unnecessary limitations are to be implied therefrom beyond the requirements of the prior art because such terms are used for descriptive purposes and are intended to be broadly construed.

Accordingly, the guide pin assembly of the present invention is simplified; provides an effective, safe, inexpensive, and efficient structure and method that achieve all the enumerated objectives; provides for eliminating difficulties encountered with prior guide pin assemblies; and solves problems and obtains new results in the art.

Having now described the features, discoveries, and principles of the invention; the manner in which the guide pin assembly of the present invention is used and installed; the characteristics of the construction, arrangement, and method steps; and the advantageous, new and useful results obtained, the new and useful structures, devices, elements, arrangements, process, parts, and combinations are set forth in the appended claims.

What is claimed is:

1. A guide pin assembly for use with heavy-duty vehicle disc brake systems, said guide pin assembly comprising:
   a hollow guide pin for mounting a component of said disc brake system;
   a fastener at least partially disposed through said guide pin and engaging another component of the disc brake system to attach the guide pin to said other component; and
   a discrete torque-separable shear adaptor at least partially disposed within said guide pin and removably attached to said fastener.

2. The guide pin assembly of claim 1, said shear adaptor further comprising an inboard end and an outboard end axially opposite said inboard end;
   said outboard end having a first shape corresponding to and engaging an interface of said fastener, said interface being shaped to receive a common tool.

3. The guide pin assembly of claim 2, said inboard end having a second shape corresponding to and engageable by a common, low-profile tool.

4. The guide pin assembly of claim 2, said outboard end being removably attached to said fastener by an adhesive.

5. The guide pin assembly of claim 1, said shear adaptor further comprising an axial length and an outer dimension, said outer dimension varying along said axial length.

6. The guide pin assembly of claim 5, said axial length being the range of from 2.00 inches to 3.00 inches.

7. The guide pin assembly of claim 5, said axial length being the range of from 2.30 inches to 2.40 inches.

8. The guide pin assembly of claim 5, said shear adaptor further comprising a piloting region,
   wherein said outer dimension of said piloting region is equivalent to or less than an inner diameter of said guide pin.

9. The guide pin assembly of claim 8, said outer dimension of said piloting region being in the range of from 0.6 inches to 1.2 inches.

10. The guide pin assembly of claim 8, said outer dimension of said piloting region being in the range of from 0.9 inches to 1.0 inch.

11. The guide pin assembly of claim 5, said shear adaptor further comprising a collar,
   wherein said outer dimension of said collar is optimized to shear at a predetermined torque rating.

12. The guide pin assembly of claim 11, said outer dimension of said collar being in the range of from 0.25 inches to 0.50 inches.

13. The guide pin assembly of claim 11, said outer dimension of said collar being in the range of from 0.35 inches to 0.42 inches.

14. The guide pin assembly of claim 11, said outer dimension of said collar being optimized to shear at a torque in the range of from 125 pound-feet to 230 pound-feet.

15. The guide pin assembly of claim 11, said outer dimension of said collar being optimized to shear at a torque in the range of from 180 pound-feet to 200 pound-feet.

\* \* \* \* \*